United States Patent Office 2,752,835
Patented July 3, 1956

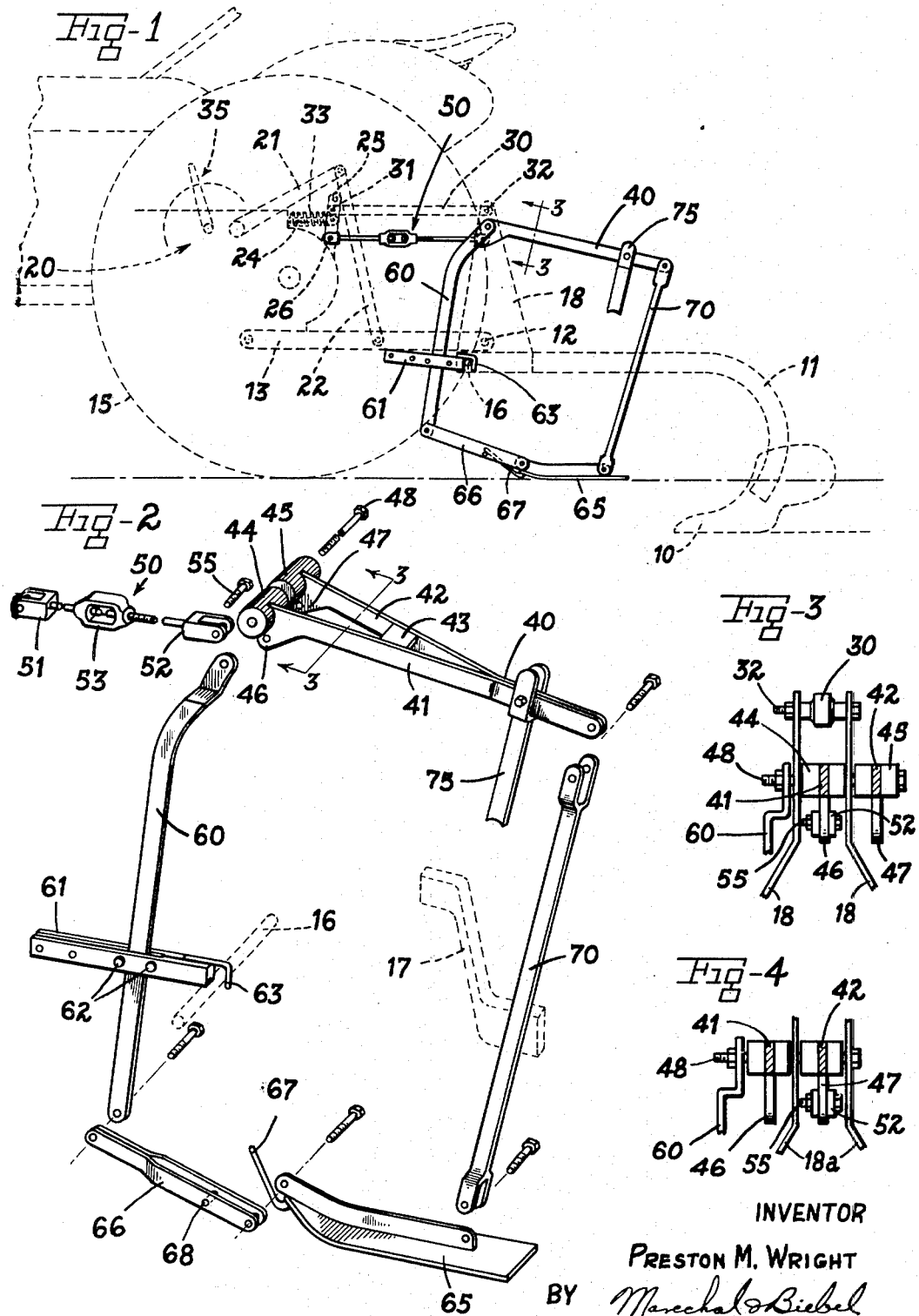

2,752,835

DEPTH CONTROL FOR PLOWS AND THE LIKE

Preston M. Wright, Vallonia, Ind.

Application November 1, 1951, Serial No. 254,422

7 Claims. (Cl. 97—46.03)

This invention relates to agricultural implements, and more particularly to tractor drawn implements such as plows and the like for operating below the surface of the ground.

The invention has as a general objective the provision of a device for use with tractors having a control responsive to the draft on the plow or other implement to actuate such control in such manner that the depth of the implement is maintained substantially constant irrespective of changes in ground consistency and the like affecting the draft of the implement. Thus, for example, many modern tractors are equipped with a hydraulic control which raises or lowers the implement in response to changes in the draft thereon in such manner as to maintain the draft conditions substantially constant. However, if there are material variations in the consistency of the soil under cultivation, the draft conditions at a given depth may vary considerably, with the result that there will be corresponding variations in the operating depth of the implement if the draft is to be maintained relatively constant.

It is accordingly a primary object of the present invention to provide a simple device for ready attachment to a tractor and implement having a control of the above character which will supplement the normal operation of the control in such manner as to compensate for the variations in draft produced by change in the soil conditions at the desired depth of operation and will thereby maintain the implement at a desired predetermined depth irrespective of changes in draft.

A particular object of the invention is to provide a device of the above character which is of simple and economical construction, embodying a minimum of component parts, which is quickly and easily mounted on and attached in operative relation with a wide range of conventional tractors and implements therefor, and which operates through the compression member normally effective to transmit changes in the draft conditions to the automatic control.

Other objects and advantages of the invention will be apparent from the following description, the accompanying drawings and the appended claims.

In the drawing:

Fig. 1 is a somewhat diagrammatic view in side elevation illustrating a device in accordance with the invention mounted in operative relation on a plow and a tractor equipped with a hydraulic control responsive to the draft on the plow;

Fig. 2 is an exploded view in the nature of a perspective illustrating the component parts of the device of Fig. 1;

Fig. 3 is a fragmentary vertical section taken approximately on the line 3—3 of Figs. 1 and 2 showing the attachment between the device and a conventional plow; and Fig. 4 is a view similar to Fig. 3 showing the attachment between the device and a plow of another size.

In the drawing, which illustrates a preferred embodiment of the invention, the conventional parts of the tractor and implement are illustrated in dotted lines and include a plowshare 10 on a plow beam 11 pivoted at 12 to a draw bar 13 which is in turn pivoted in the usual way to the main frame of the tractor, the rear wheel of which is indicated at 15. In the usual plow construction, there is a pair of plows and plow beams connected by bracing cross bars 16 and 17, and a pair of flat frame members 18 extend upwardly from the two plow beams as shown.

The hydraulic control for the plow or other implement is indicated generally at 20 and operates through the pivoted lift arms 21 and 22 to raise and lower the plow. In the operation of a conventional unit of this type such as in found in a Ford, Ferguson, or Ford-Ferguson tractor, the effective hydraulic pressure on a lift arm is controlled by a by-pass valve (not shown) operated by a sliding rod 24 pivoted at its outer end to an arm 25 which is in turn pivoted at 26 on the tractor frame. A compression link 30 is pivoted at 31 to the arm 25 and is pivoted at 32 between the parts 18 of the plow frame. A spring 33 is mounted on rod 24 between arm 25 and the tractor frame to counterbalance the compressive forces transmitted through the compression link 30, and an adjustable hand control indicated generally at 35 is provided for varying the effective pressure on the lift arms in accordance with the desired draft conditions to be maintained on the plow.

In the conventional operation of this unit, if the draft increases beyond that for which the control 35 is set, the resulting pull on the plow will cause it to pivot counterclockwise as viewed in Fig. 1 on its pivot 12, and this movement will be transmitted through the compression link 30 to force the rod 24 forwardly in such manner as to change the by-pass valve setting and provide proper hydraulic force to raise the plow. If on the other hand the draft decreases, the plow will tend to pivot clockwise in Fig. 1 and thus act through link 30 to draw the rod 24 rearwardly, which will in turn readjust the by-pass valve to provide the proper hydraulic force to lower the plow until the desired draft conditions are reestablished.

The above structure and operation is typical of conventional constructions of this character. It will be seen that if the soil conditions are generally constant, this control will maintain the plow at an essentially uniform depth by maintaining substantially constant draft condition. However, if the consistency of the soil alternates between hard and soft, or light and heavy, considerable vertical movement of the plow may be necessary in order to maintain constant draft, and obviously the depth at which the plow operates will be correspondingly changed, producing a furrow of non-uniform depth. The present invention provides a device for use with a tractor and plow having such a hydraulic control which will compensate for changes in draft conditions without permitting vertical movement of the plow and which will accordingly operate through the hydraulic control to maintain the plow at a constant depth irrespective of changes in draft conditions.

The device of the invention includes a Y-shaped upper member 40 which constitutes a bell crank and includes a pair of arms 41 and 42 connected by a cross brace 43. Each arm has a transversely arranged bearing 44, 45 at its forward end, and each arm 41 and 42 also has an apertured ear 46, 47 extending below the bearing thereon. The bearings 44 and 45 are proportioned to fit alternatively between the upper ends of the frame portions 18 of the plow depending upon the size of the plow, the bearing 44 being mounted between the frame portions in conventional 12-inch plows as shown in Fig. 3, and the bearing 45 being mounted between the frame portions 18a (Fig. 4) of 14-inch and larger plows. In either case, a pivotal connection is provided by a bolt 48 extending through the plow frame portions and both of the bearings 44 and 45 as shown, in place of the bolt and spacer commonly provided between frame portions 18, and this alternative arrangment provides for effective centering of the device with both sizes of plow.

The bell crank 40 is provided with a pivotal connection to the tractor frame at a fixed distance from the frame by means of an arm 50 comprising a pair of clevis members 51 and 52 and a turnbuckle 53 forming an adjustable connection between the clevis members. The front clevis 51 is connected with the tractor by means of the pivot 26 for the arm 25, and the rear clevis 52 is pivoted by a bolt 55 to the ear 46 or 47 which is located between the frame portions 18 or 18a of the plow.

A bar 60 is mounted at its upper end on the plow frame by means of the pivot bolt 48 for the bearings 44 and 45. A Y-shaped brace 61 is clamped by bolts 62 on the midportion of bar 60, and this brace includes a hook 63 at its rearward end adapted to fit over the cross brace 16 of the plow, thus cooperating with the pivot bolt 48 to form a fixed mounting for bar 60 on the plow frame. The Y-shaped brace 61 and the bolts 62 are provided for adjustment of these parts to plows of different types or sizes.

A ground engaging shoe 65 is pivotally connected with the lower end of bar 60 by means of a Y-shaped link 66, this construction providing greater flexibility than a one-piece shoe directly pivoted to bar 60. The shoe 65 is formed with an upwardly projecting finger 67 at its forward end for parting weeds or grass and the like, and a cross pin 68 in the link 66 form a stop for finger 67 limiting downward pivotal movement of the shoe about its connection to the link. At its rearward end, the shoe 65 is connected by a long link 70 with the rearward end of the bell crank 40 to cause upward or downward movement of crank 40 about its pivot 55 in response to similar movement of the shoe with respect to the plow frame. A bar 75 is bolted to bell crank 40 near its rearward end and extends downwardly to engage and ride on the plow cross bar 17 to support these parts when the plow is in raised position.

In operation with a tractor and plow equipped with the device of the invention as shown, the manual control 35 is first adjusted to provide for at least slightly more than the heaviest draft to be expected at the desired depth in the soil to be plowed. Then after the plowshare is at the desired depth, the turnbuckle 53 is adjusted until the shoe 65 is seated firmly on the upper surface of the ground. Thereafter, whenever in operation the plowshare encounters soil conditions decreasing the effective draft on the plow, the normal result without the device of the invention would be for the control 20 to be actuated in such manner as to lower the plow further into the ground. However, this would in turn result in relative upward movement of the shoe 65, and any tendency to such movement is transmitted through link 70 into upward movement of the bell crank 40 about its pivot 55 on arm 50. The movement of the bell crank in turn is transmitted through pivot 48 to the frame members 18 and acts to compensate for the decrease in the effective draft produced by the lightened soil and thereby to hold constant the compressive loading on the compression link 30.

This action takes place whenever there is a decrease in the effective draft below the draft conditions established by the initial setting of the hand control 35 and turnbuckle 53, and the plow is accordingly maintained against movement lower than the desired depth. Since in this initial adjustment, the control 20 is set for heavier draft conditions than the maximum to be expected, there is no occasion for lifting movement thereby so long as the ground level remains substantially even, and the plow is therefore maintained at a constant depth irrespective of changes in the effective draft conditions.

The device of the invention also operates to maintain constant depth of the plow or other implement when the ground level is not uniform and hence when the relative attitudes of the tractor and implement are subject to frequent change. Such changes in attitude with the conventional control result first in upward or downward movement of the implement, which then results in changing the effective pressure on compression link 30 and thus in actuating the hydraulic system to reestablish the preset draft condition and attitude relation of the tractor and implement. The power for this correcting action is delivered to the implement through the wheels and traction of the tractor, with resulting expenditure of horsepower of the motor beyond that normally required.

When the device of the invention is utilized as described, the location of the shoe or feeler 65 between the plowshares of the double plow and directly over the ground being tilled results in immediate sensing by the shoe of a change of the ground surface from an even plane, and this change is accordingly transmitted through the device to the compression link 30. Thus if the shoe approaches a rise in the ground, in conforming to this change the shoe will cause upward movement of the link 70 which will be transmitted through the bell crank 40 to the compression link 30 and hydraulic control, actuating the latter to raise the plow sufficiently to maintain a constant measured depth of the furrow. Conversely, if the ground level declines, the shoe will release pressure on link 70 with resulting lowering movement of the bell crank around its pivot to reduce the compensating pressure on compression link 30 and thus to actuate the hydraulic control to lower the plowshare further into the ground.

It will accordingly be seen that the present invention provides a simple but highly effective device which is readily attached to any implement and tractor having a conventional draft control of the above type, and which operates through automatic control both to compensate for differences in the draft conditions existing at the desired depth as compared with the depth at which the plow would operate at a given setting of the control if the latter were responsive only to draft, also to correct for variation in ground level which would otherwise tend to cause undesired change in the furrow depth. Thus applicant's device does not by-pass or work independently of the automatic control but works through and in conjunction with it, by holding constant the total effective load on the compression link 30 through which the variations in draft are normally transmitted to the control.

The device of the present invention offers outstanding advantages of quick and easy attachment to the existing tractor and implement structure. Since the only connection of the device to the tractor itself is at the existing pivot 26 for the arm 25, no alteration or permanent attachment to the tractor is required, and it is also unnecessary to modify the existing plow and tractor structure in any way. In addition, with the device constructed as described for alternative mounting on plows of different types and sizes, proper centering of the device is assured so that the shoe 65 will be substantially directly between the two plowshares of a given double plow and thus will directly measure the ground actually about to be plowed and thus provide maximum accuracy of depth control.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Apparatus for maintaining a predetermined operating depth of an implement operated by a tractor having a control for raising and lowering the implement in response to variation of the draft on the implement to maintain the draft substantially constant by changing the depth of the implement, said control having a compression member connecting said control with said implement and directly transmitting variations in draft to said control, said apparatus comprising a ground engaging member, a crank, a substantially rigid link constructed at one end for attachment to said tractor and including a pivot for said crank at a predetermined fixed distance from said one end, means for mounting said crank on said implement eccentrically of said pivot, and means connecting said ground engaging member with said crank to cause variation in the effective pressure between said ground engaging member and the ground in response to changes in the draft effective on said implement and thereby to maintain said implement at a substantially constant depth irrespective of such changes in draft.

2. Apparatus for maintaining a predetermined operating depth of an implement operated by a tractor having a control for raising and lowering the implement in response to variation of the draft on the implement to maintain the draft substantially constant by changing the depth of the implement, said control having a compression member connecting said control with said implement and directly transmitting variations in draft to said control, said apparatus comprising a ground engaging member, a crank, a substantially rigid link constructed at one end for attachment to said tractor and including a pivot for said crank at a predetermined fixed distance from said one end, means for mounting said crank on said implement eccentrically of said pivot, means connecting said ground engaging member with said crank to cause variation in the effective pressure between said ground engaging member and the ground in response to changes in the draft effective on said implement and thereby to maintain said implement at a substantially constant depth irrespective of such changes in draft, and means for adjusting said distance of said pivot from said tractor to vary said predetermined depth for said implement.

3. Apparatus for maintaining a predetermined operating depth of an implement operated by a tractor having a control for raising and lowering the implement in response to variation of the draft on the implement to maintain the draft substantially constant by changing the depth of the implement, comprising a compression member connecting said control with said implement and directly transmitting variations in draft to said control, a ground engaging member, a crank, a support attached at one end to said tractor and including a pivot for said crank spaced at a predetermined fixed distance from said tractor, means for mounting said crank on said implement eccentrically of said pivot, and means forming a thrust connection between said ground engaging member and said crank to cause variation in the effective pressure between said ground engaging member and the ground in response to changes in the draft effective on said implement in order to maintain said implement at a substantially constant depth irrespective of such changes in draft.

4. Apparatus for maintaining a predetermined operating depth of an implement operated by a tractor having a control for raising and lowering the implement in response to variation of the draft on the implement to maintain the draft substantially constant by changing the depth of the implement, said control having a compression member connecting said control with said implement and directly transmitting variations in draft to said control, said apparatus comprising a ground engaging member, an arm constructed for pivoting at its forward end to said tractor, a bell crank, means pivoting said bell crank on the rearward end of said arm to support said bell crank in fixed spacing with said tractor, means for pivoting said bell crank to said implement eccentrically of said pivotal connection thereof to said arm, and a compression link connecting said ground engaging member with said bell crank to transmit changes in the pressure load between said implement and said ground engaging member in response to changes in the draft effective on said implement in order to maintain said implement at a substantially constant depth irrespective of such changes in draft.

5. Apparatus for maintaining a predetermined operating depth of an implement operated by a tractor having a control for raising and lowering the implement in response to variation of the draft on the implement to maintain the draft substantially constant by changing the depth of the implement, said implement including a pair of upwardly extending frame members connected with said control by a compression member transmitting variations in draft to said control, said apparatus comprising a ground engaging member, means for pivotally mounting said ground engaging member on said implement to gauge the depth of said implement, a bell crank including a pair of laterally spaced arms at the forward end thereof, each said arm having a bearing at the forward end thereof adapted to be alternatively received between said implement frame members to provide for centering said crank with implements of different sizes, means for pivoting said bearings to said frame members, a support constructed for pivoting at the forward end thereof to said tractor, means pivoting the rearward end of said support to said crank eccentrically of said bearings to provide a pivot for said crank at a fixed distance from said tractor, and a compression link connecting said ground engaging member with said bell crank to transmit changes in the pressure load between said implement and said ground engaging member in response to changes in the draft effective on said implement and to maintain said implement at a substantially constant depth irrespective of such changes in draft.

6. Apparatus for maintaining a predetermined operating depth of an implement operated by a tractor having a control for raising and lowering the implement in response to variation of the draft on the implement to maintain the draft substantially constant by changing the depth of the implement and including a compression member connecting said control with the implement and directly transmitting variations in draft to said control, comprising a ground engaging member, means forming a crank providing a pair of pivot means arranged in relatively parallel and radially offset relation, means cooperating with one of said pivot means to mount said crank on said implement with the axis of said pivot means extending generally horizontally and in radially offset relation with the connection between said compression member and said implement, means connecting said ground engaging member with said crank to provide for up and down movement of said ground engaging member and said crank with respect to said implement on said one pivot means, and means forming a rigid connection between the other said pivot means and said tractor providing for up and down movement of said crank and said ground engaging member about said other pivot means to cause said implement to form a direct thrust connection between said ground engaging member and said compression member for transferring the pressure load between said implement and said ground engaging member in response to changes in the draft effective on said implement and thereby to maintain said implement at a substantially constant depth irrespective of such changes in draft by maintaining a constant total pressure load on said ground engaging member and said implement sufficient to counterbalance said control.

7. Apparatus for maintaining a predetermined operating depth of an implement operated by a tractor having a control for raising and lowering the implement in response to variation of the draft on the implement to maintain the draft substantially constant by changing the depth of the implement and including a compression member connecting said control with the implement and directly transmitting variations in draft to said control, comprising a ground engaging member, means forming a crank providing a pair of pivot means arranged in relatively parallel and radially offset relation, means cooperating with one of said pivot means to mount said crank on said implement with the axis of said pivot means extending generally horizontally and in radially offset relation with the connection between said compression member and said implement, means connecting said ground engaging member with said crank to provide for up and down movement of said ground engaging member and said crank with respect to said implement on said one pivot means, link means forming a rigid connection between the other said pivot means and said tractor providing for up and down movement of said crank and said ground engaging member about said other pivot means to cause said implement to form a direct thrust connection between said ground engaging member and said compression member for transferring the pressure load between said implement and said ground engaging member in response to changes in the draft effective on said implement and thereby to maintain said implement at a substantially constant depth irrespective of such changes in draft by maintaining a constant total pressure load on said ground engaging member and said implement sufficient to counterbalance said control, and said link means including means for adjusting the length of said rigid connection to vary the spacing of said other pivot means from said tractor and thereby to establish a different predetermined depth of operation for said implement.

References Cited in the file of this patent

UNITED STATES PATENTS

| | | |
|---|---|---|
| 2,405,334 | Silver | Aug. 6, 1946 |
| 2,534,761 | Englund | Dec. 19, 1950 |
| 2,621,575 | Berg | Dec. 16, 1952 |
| 2,622,499 | Fraga | Dec. 23, 1952 |

FOREIGN PATENTS

| | | |
|---|---|---|
| 541,436 | Great Britain | Nov. 26, 1941 |
| 599,020 | Great Britain | June 19, 1945 |